(12) United States Patent
Bergamini et al.

(10) Patent No.: US 9,638,342 B2
(45) Date of Patent: May 2, 2017

(54) CONTROL VALVE FOR GAS AND LIQUIDS

(71) Applicant: Nuovo Pignone Srl, Florence (IT)

(72) Inventors: Lorenzo Bergamini, Florence (IT); Vincenzo Pietanza, Florence (IT)

(73) Assignee: Nuovo Pignone Srl, Florence (IT)

( * ) Notice: Subject to any disclaimer, the term of this patent is extended or adjusted under 35 U.S.C. 154(b) by 38 days.

(21) Appl. No.: 14/391,747

(22) PCT Filed: Apr. 5, 2013

(86) PCT No.: PCT/EP2013/057162
§ 371 (c)(1),
(2) Date: Oct. 10, 2014

(87) PCT Pub. No.: WO2013/152993
PCT Pub. Date: Oct. 17, 2013

(65) Prior Publication Data
US 2015/0114498 A1 Apr. 30, 2015

(30) Foreign Application Priority Data
Apr. 12, 2012 (IT) ................ FI2012A0074

(51) Int. Cl.
*F16K 27/04* (2006.01)
*F16K 47/08* (2006.01)
*F16K 3/24* (2006.01)
(52) U.S. Cl.
CPC ............. *F16K 27/041* (2013.01); *F16K 3/24* (2013.01); *F16K 47/08* (2013.01); *Y10T 137/87265* (2015.04); *Y10T 137/87539* (2015.04)

(58) Field of Classification Search
CPC .......... F16K 27/041; F16K 3/24; F16K 47/08; F16K 47/04; Y10T 137/87265;
(Continued)

(56) References Cited

U.S. PATENT DOCUMENTS 4,149,563 A * 4/1979 Seger ................ F16K 3/34
137/625.3
5,018,703 A 5/1991 Goode
(Continued)

FOREIGN PATENT DOCUMENTS

CN 86208469 U 11/1987
CN 2070382 U 1/1991
(Continued)

OTHER PUBLICATIONS

Italian Search Report and Opinion issued in connection with corresponding IT Application No. 20120074 on Nov. 9, 2012.
(Continued)

*Primary Examiner* — Michael R Reid
(74) *Attorney, Agent, or Firm* — GE Global Patent Operation

(57) ABSTRACT

A valve comprising a valve body with a fluid inlet, a fluid outlet, an inner cavity and an outer cavity at least partly surrounding the inner cavity. The outer cavity is in fluid communication with the fluid inlet and with the inner cavity and the inner cavity is in fluid communication with the fluid outlet. A flow splitter is provided, forming at least two flow passages in the outer cavity.

23 Claims, 5 Drawing Sheets

(58) Field of Classification Search
CPC ..... Y10T 137/87539; Y10T 137/86718; Y10T 137/86734; Y10T 137/86759; Y10T 137/86791; Y10T 137/86799; Y10T 137/86807; Y10T 137/86815; Y10T 137/87788
USPC .............. 137/625.28, 625.3, 625.33, 625.37, 137/625.38, 625.39, 625.4, 872; 251/118; 138/40, 43
See application file for complete search history.

(56) References Cited

U.S. PATENT DOCUMENTS

| | | | |
|---|---|---|---|
| 5,931,445 A * | 8/1999 | Dvorak | F16K 47/04 251/118 |
| 6,394,134 B1 | 5/2002 | Kwon | |
| 6,701,957 B2 | 3/2004 | McCarty et al. | |

FOREIGN PATENT DOCUMENTS

| | | |
|---|---|---|
| CN | 1306608 A | 8/2001 |
| CN | 1543545 A | 11/2004 |
| CN | 101418870 A | 4/2009 |
| CN | 101865297 A | 10/2010 |
| EP | 0591873 A1 | 4/1994 |
| FR | 2382639 A1 | 9/1978 |
| FR | 2624245 A1 | 6/1989 |
| GB | 2213286 A | 8/1989 |
| WO | 2011085974 A1 | 7/2011 |

OTHER PUBLICATIONS

PCT Search Report and Written Opinion issued in connection with corresponding PCT Application No. PCT/EP2013/057162 on May 14, 2013.
Unofficial English translation of Office Action issued in connection with corresponding CN Application No. 201380019411.9 on Feb. 2, 2016.

* cited by examiner

STATE OF THE ART

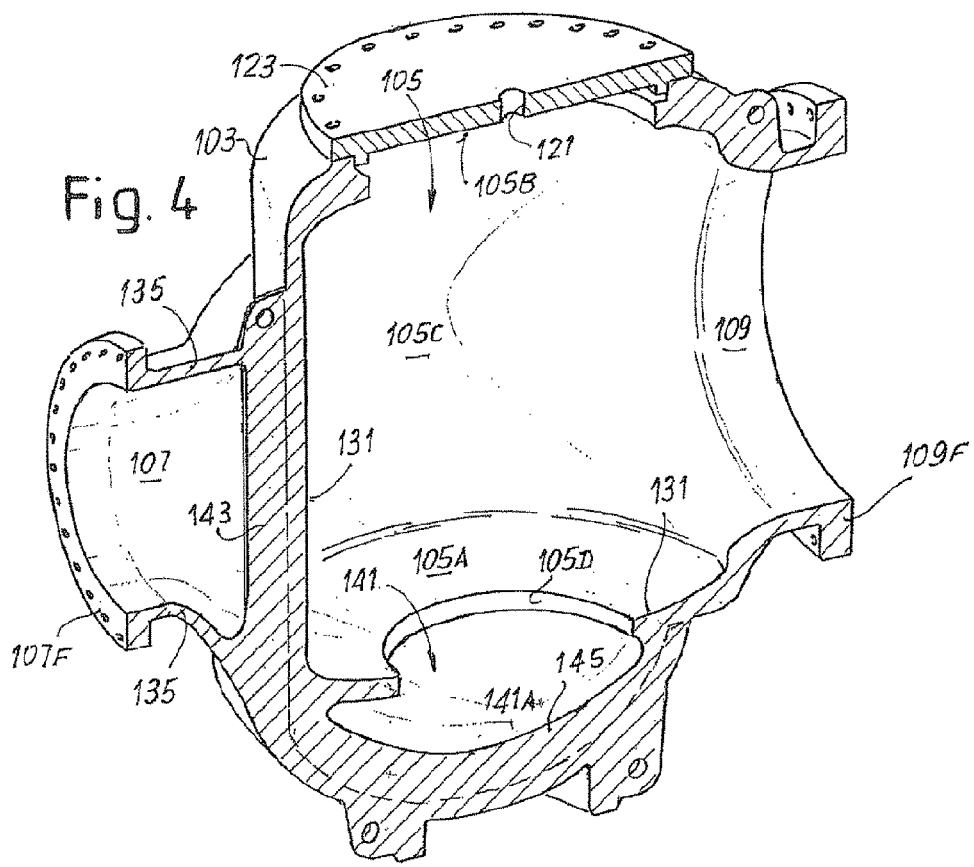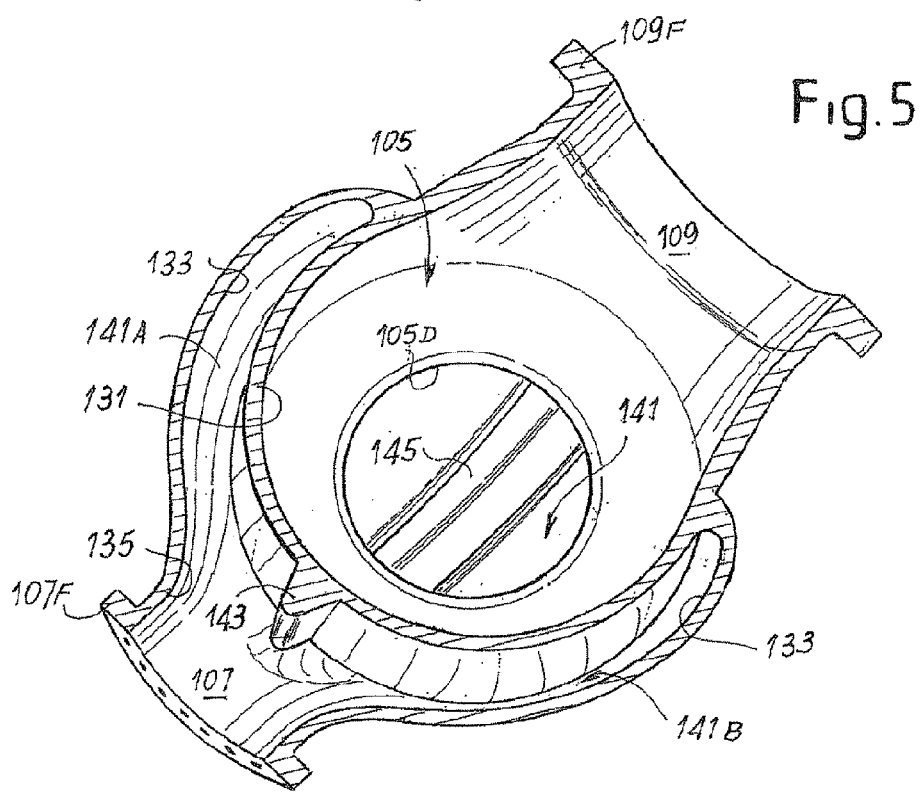

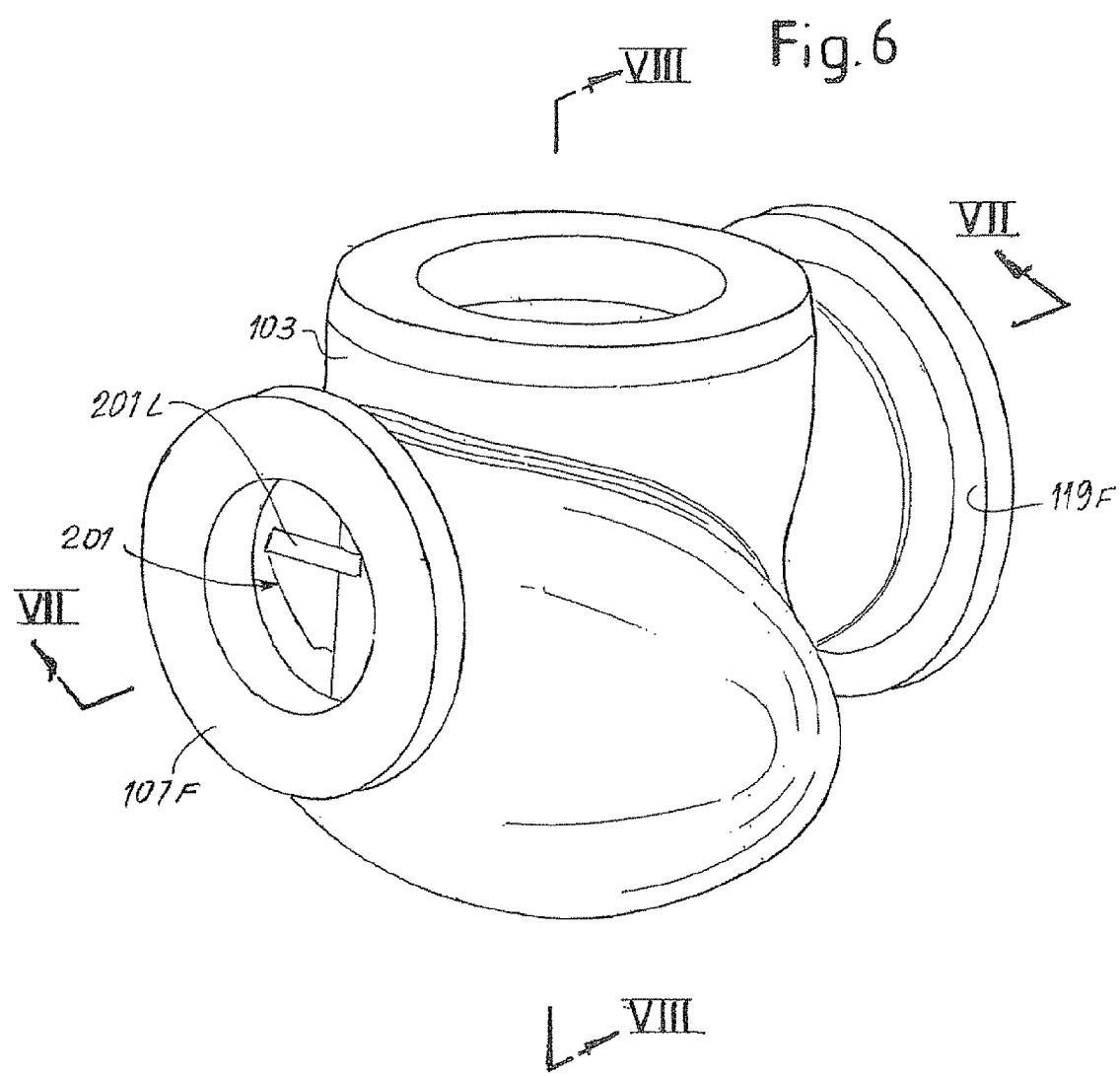

CONTROL VALVE FOR GAS AND LIQUIDS

FIELD OF THE INVENTION

Embodiments of the present invention relate to control valves, such as for example so-called globe valves for both gas and liquids.

DESCRIPTION OF RELATED ART

In a globe valve, flow between a fluid inlet and a fluid outlet is controlled by a plug movably within an inner cavity. In some globe valves a throttling cage is provided in the inner cavity and the plug is movably arranged in the throttling cage.

A globe valve according to the prior art is shown in FIG. 1. The valve, labeled 1 as a whole, comprises a valve body 3 with a fluid inlet 5 and a fluid outlet 7. The fluid inlet 5 has an inlet flange 5F and the fluid outlet 7 has an outlet flange 7F. The inlet flange 5F and the outlet flange 7F are coaxial, A-A being the common axis of the two flanges 5F and 7F.

The valve body 3 forms an inner cavity 9, wherein a throttling cage 11 is arranged. The throttling cage 11 houses a movable plug 13. The movable plug 13 moves according to double arrow f13 to open and close the valve. Movement is controlled by means of a stem 15, which passes through a passage 17 in a bonnet 19. The bonnet 19 closes the inner cavity 9 of the body valve 3. The throttling cage and the movable plug are co-axial. The common axis B-B of the throttling cage 11 and of the movable plug 13 is substantially orthogonal to the axis A-A of the inlet flange 5F and the outlet flange 7F.

The movable plug 13 co-acts with a closure seat 21 formed in the inner surface of the throttling cage 11. In the position shown in FIG. 1 the movable plug 13 is in its lower position and closes the valve 1, by sealingly contacting the closure seat 21.

By moving the movable plug 13 upwards the valve can be gradually opened to let the fluid flowing there through. Depending upon the position of the movable plug 13, the flow across the valve 1 can be adjusted.

The center line of the fluid outlet 7, represented by the axis A-A, is placed approximately at the level of the closure seat 21 and underneath the fluid pervious portion 11A of the throttling cage 11. Due to the position of the outlet flange 7F with respect to the throttling cage 11 and the closure seat 21, the fluid exiting the valve follows an S-shaped flow path. Especially when the fluid flowing across the valve 1 is a gas, which expands when flowing through the throttling cage 11, the S-shaped flow path causes a local increase of the flow speed. The speed increase generates vibrations and noise during operation of the valve 1.

The globe valves of the current art are sensitive to inlet flow instability and non-uniformity of the flow, due to swirls approaching the inlet of the valve from upstream piping. The swirls and/or unstable fluid patterns can generate unacceptable forces on the plug, which may lead to failures (galling or stem seizure).

A need therefore exists for an improved valve, in particular an improved globe valve, which at least partly alleviates one or more of the above mentioned problems.

SUMMARY OF THE INVENTION

The present disclosure is drawn to a valve comprising a body with a fluid inlet and a fluid outlet, an inner cavity and a plug movably arranged in the inner cavity for selectively opening and closing the valve. A flow splitter is further provided, which splits the inlet flow into two partial flows, which are separately delivered from the fluid inlet towards the inner cavity of the valve. According to some embodiments, an outer cavity is provided, at least partly surrounding the inner cavity and in fluid communication with the fluid inlet and with the inner cavity. The flow splitter divides the outer cavity in two parts forming two separate flow passages. The flow passages have, in an embodiment, a flat cross section.

According to some embodiments, a valve is provided comprising: a valve body comprising an inner cavity, a fluid inlet and a fluid outlet, and a plug moveably arranged in the inner cavity; at least one flow splitter forming at least two flow passages between said fluid inlet and said inner cavity.

Provision of the flow splitter reduces or eliminates flow swirls impinging against the valve plug, thus alleviating or eliminating the above mentioned problems of stress and failure risks.

According to some embodiments, the valve comprises: a valve body having a fluid inlet, a fluid outlet, an inner cavity and an outer cavity at least partly surrounding said inner cavity; a valve plug movably arranged in the inner cavity for controlling the flow across the valve; wherein the outer cavity is in fluid communication with the fluid inlet and with inlet cavity; wherein the inner cavity is in fluid communication with the fluid outlet; and wherein at least one flow splitter forming at least two flow passages is provided in the outer cavity.

In some embodiments the plug is movably arranged in a throttling cage provided in the inner cavity of the valve. The throttling cage is provided with an at least partly fluid pervious wall, e.g. provided with flow ports. The plug is closely received in the throttling cage and movable along the longitudinal axis thereof, to selectively cover the flow ports of the throttling cage, thereby restricting flow between the outer cavity and the inner cavity.

The flow splitter, in an embodiment, extends across the fluid inlet, dividing said fluid inlet in at least two ports in fluid communication with the outer cavity. The ports are, in an embodiment, symmetrical.

In particularly advantageous embodiments, the valve body is formed as one single integrally formed body, made by casting, for example, and comprising an inner wall surrounding the inner cavity and an outer wall at least partly surrounding said inner wall. The outer cavity is formed between the outer wall and the inner wall of said valve body. The inner wall can develop sideways to form the fluid outlet. For example, the inner wall can have a main, substantially cylindrical portion, from which a duct forming the fluid outlet extends sideways. The fluid outlet can be provided with an outlet flange. In turn, the outer wall can define an inlet flange and a duct, forming the fluid inlet.

The inlet flange and outlet flange are, in an embodiment, substantially coaxial.

In some embodiments, the flow splitter comprises: a first projection extending from the inner wall and facing the fluid inlet; and a second projection extending from the outer wall and facing the inner wall. In an embodiment, the second projection is arranged opposite an aperture in the inner wall, said aperture placing the inner cavity in fluid communication with the outer cavity.

In an embodiment, the first projection merges in the second projection thus forming a flow splitter having a continuous elongate body.

In some embodiments, the plug of the valve is movable to selectively open and close the aperture in the inner wall opposite the flow splitter.

According to some embodiments, secondary flow splitters can be provided in the outer cavity. For instance, each said secondary flow splitter extends from said inner wall to said outer wall across a width of the respective flow passage in said outer cavity.

Providing an outer cavity, which surrounds the inner cavity housing the plug of the valve, can provide further advantages. As mentioned above, prior art valves providing co-axial inlet and outlet flanges suffer from the disadvantage of having an S-shaped outlet duct extending from the throttling cage towards the outlet flange. The S-shaped duct generates vibrations and noise, due to the acceleration of the fluid flowing there through.

Providing an outer cavity, partly surrounding the inner cavity of the valve body allows an improved design of the valve body, where the shape of the outlet duct, extending from the inlet cavity to the outlet flange is almost rectilinear. This can be obtained, e.g. by arranging the inlet aperture, fluidly connecting the inner cavity and the outer cavity, at a level below the level of the outlet flange, or aligned with the lower point of the outlet flange. The terms "lower" or "below" are referred to a position of the valve with the plug control members arranged on top of the valve. The fluid flows from the inlet flange around the inner wall downwards and enters the inner cavity from the end opposite the bonnet, where the closure seat of the throttling cage (if present) is positioned. While in prior art valves this closure seat is approximately at the level of the inlet and outlet flanges, in some embodiments of the valve according to the present disclosure the closure seat can be arranged in a lower position, so that the outlet flow path, from the inner cavity to the outlet flange is substantially or nearly rectilinear.

More generally, the closure seat can be arranged between the outer cavity and a center line of the fluid outlet, i.e. of the outlet flange. In an embodiment, the distance between the closure seat and the outer cavity is smaller than the distance between said closure seat and the center line of said fluid outlet.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 3, 4 and 5 illustrate sectional perspective views of the body of the valve of FIG. 2;

FIG. 6 illustrates a perspective view of a valve body in a further embodiment;

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
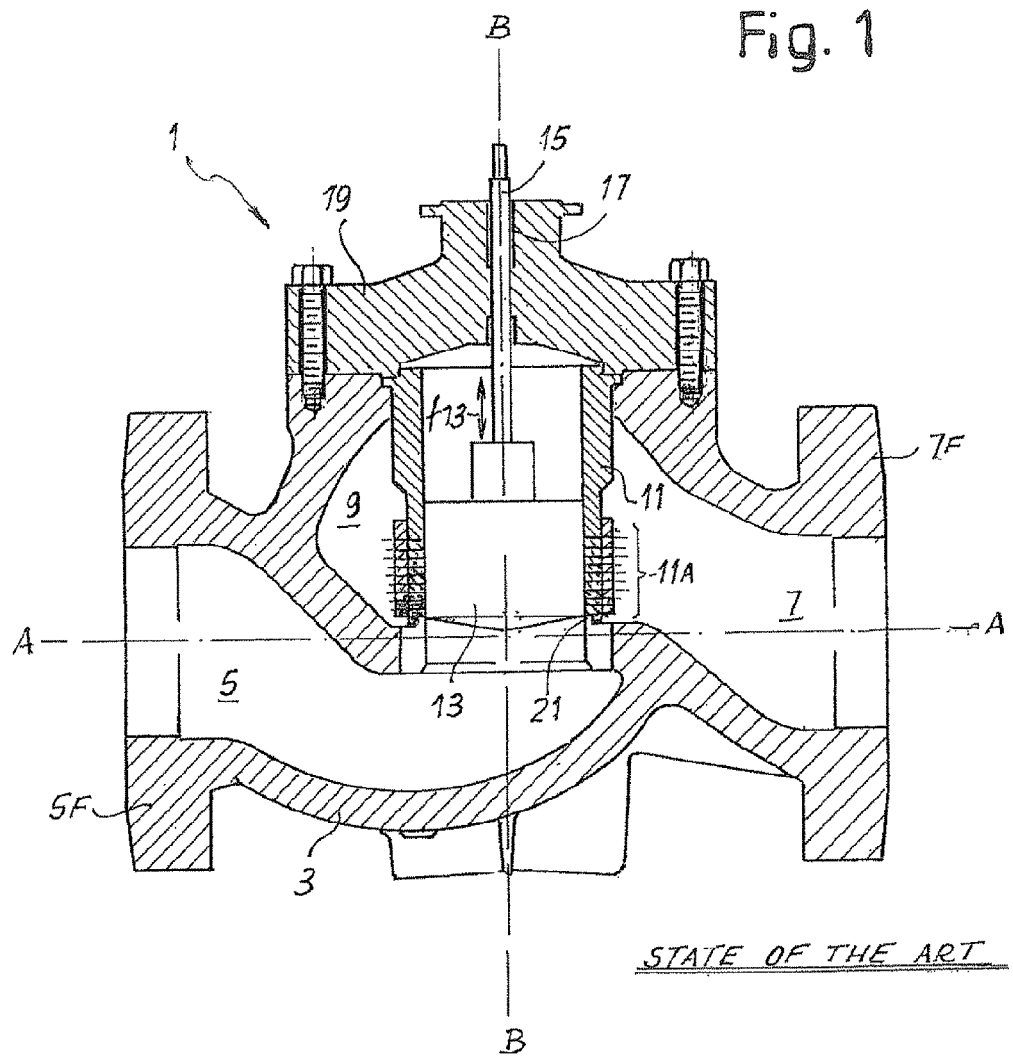
FIG. 1 shows a longitudinal section along a plane containing the pipe center line and the plug center line of a globe valve according to the current art.
Figure 2:
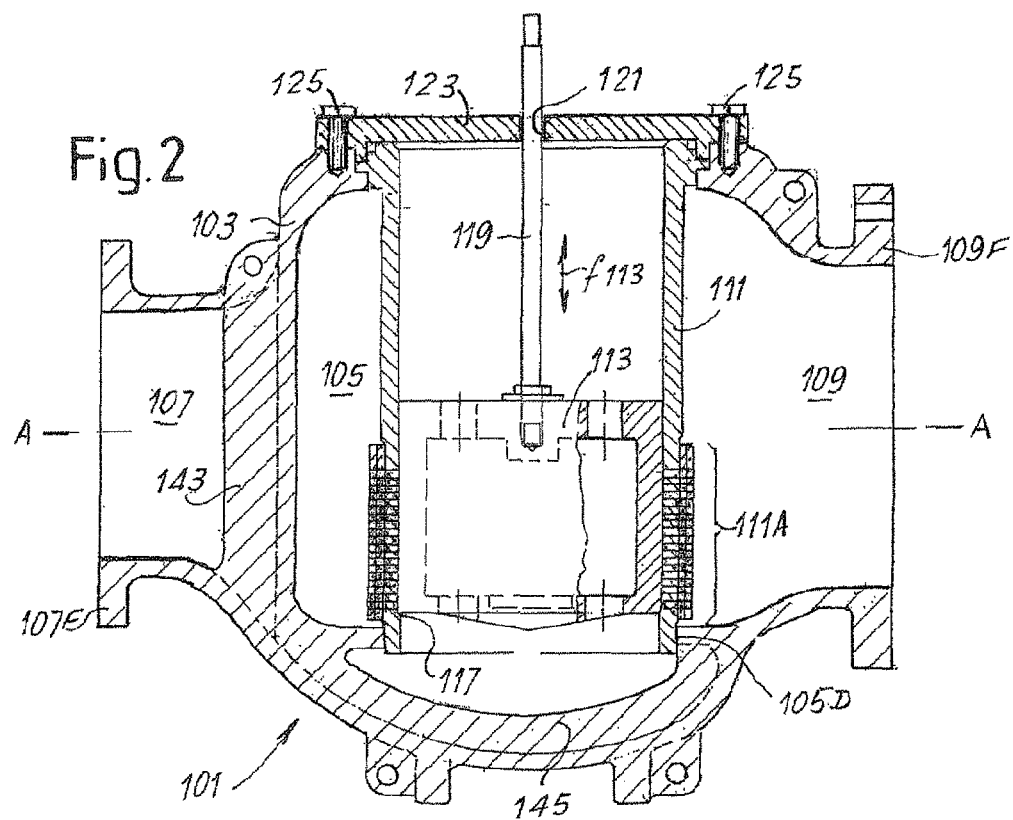
FIG. 2 illustrates a longitudinal section along a plane containing the pipe center line and the plug center line of a valve according an embodiment of the subject matter disclosed herein.

Referring firstly to FIG. 2, in one embodiment a globe valve according to the present disclosure is designated 101 as a whole. The valve 101 comprises a valve body 103, forming an inner cavity 105 therein. The valve 101 further comprises a fluid inlet 107 surrounded by a inlet flange 107F, and a fluid outlet 109 surrounded by an outlet flange 109F. In the exemplary embodiment illustrated in the drawings, the inlet flange 107F and the outlet flange 109F are co-axial, i.e. they have a common center line A-A, such that the valve 101 can be mounted between two co-axial pipes (not shown), whereto the valve 101 is flanged by means of flanges 107F and 109F, respectively.

In some exemplary embodiments, as shown in FIG. 2, a throttling cage 111 can be arranged in the inner cavity 105. A movable plug 113 is movably arranged inside the throttling cage 111. The movable plug can move axially according to double arrow f113 to selectively opening and closing the valve 101, or else throttle the flow there through. In the position shown in FIG. 2 the valve is closed and the movable plug 113 sealingly contacts a closure seat 117 provided on the inner surface of the throttling cage 111, in a position underneath a fluid pervious portion 111A of the throttling cage. Distancing the movable plug 113 from the closure seat 117 will gradually open the valve allowing the fluid to flow there through.

The movement of the movable plug 113 is controlled by an actuator (not shown) acting on the movable plug 113 by means of a stem 119. The stem 119 passes through a through hole 121 provided in a bonnet 123 screwed by means of screws 125 to the body 103 of the globe valve 101.

Figure 3:
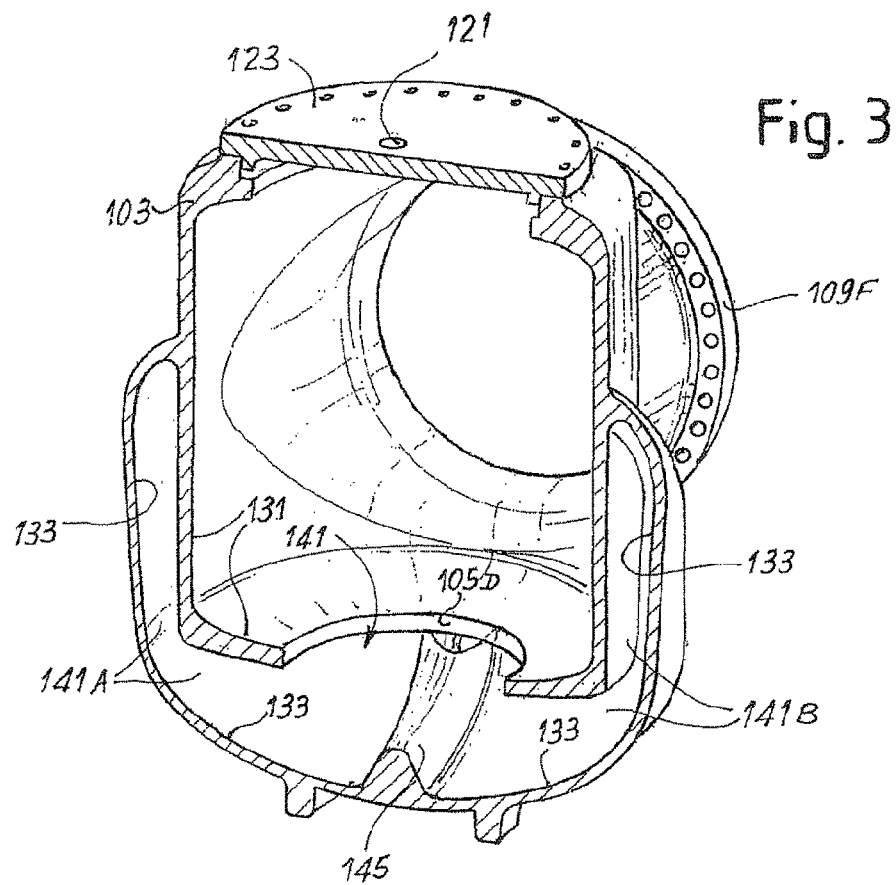

The shape of the inner cavity 105 can best be seen in the perspective and sectional views of FIGS. 3 to 5, wherein the movable plug 113 and the throttling cage 111 have been omitted for the sake of clarity.

The inner cavity 105 has a first end 105A, an opposite, second end 105B and a side portion 105C extending there between. In this exemplary embodiment the bonnet 123 is arranged at the second end 105B, whilst the side portion 105C and the first end 105A are integrally formed by the valve body 103. The valve body 103 can be manufactured by casting.

The first end 105A has a central aperture 105D, wherein one end portion of the throttling cage 111 is sealingly engaged. The opposite end portion of the throttling cage 111 is screw-fastened between the valve body 103 and the bonnet 123, as shown in FIG. 2.

The first end 105A and the side portion 105C of the inner cavity 105 are formed by an inner wall 131 of the valve body 103. In the exemplary embodiment shown in the drawings, the central portion of the inner wall 131 is substantially cylindrical. Other shapes are possible.

The inner wall 131 is partly surrounded by an outer wall 133 extending around the lower part of the inner wall 131 and underneath thereof. The outer wall 133 extends from the central part of the valve body 103 to form the inlet flange 107F and an inlet duct 135, which represents a first portion of the flow inlet 107.

On the side opposite the inlet flange 107F, the inner wall 131 extends outwardly to form the outlet flange 109F as well as the flow outlet 109 extending from the inner cavity 105 to the outlet flange 109F.

The outer wall 133 and the inner wall 131 define an outer cavity 141 there between. The outer cavity 141 partly surrounds the inner cavity 105. The outer cavity 141 extends towards the inlet flange 107F. The outer cavity 141 is thus in fluid communication with the inlet port formed by the inlet flange 107F and the inlet duct 135.

As can best be seen in FIG. 5, on the outer surface of the inner wall 131 opposing the inlet flange 107F a projection 143 is provided. The projection 143 divides the fluid inlet in two ports in fluid communication with the outer cavity 141. In the exemplary embodiment shown, the projection 143 has a substantially triangular cross-section with a rounded top corner. A different cross-sectional shape can be used. In the exemplary embodiment illustrated in the drawings the projection 143 is substantially symmetrical with respect to the inlet flange 107F and the flow inlet 107. The projection 143 extends around the outer surface of the inner wall 131 and merges into a projection 145 provided on the inner surface of the outer wall 133, facing the aperture 105D provided in the inner wall 131 delimiting the inner cavity 105.

In the exemplary embodiment shown in the drawings, also the projection 145 has a triangular cross-section with a rounded top corner, but a different shape can be used instead, e.g. a rectangular cross-section.

The two projections 143 and 145 develop as a single integral body which extends across the flow inlet 107, in front of the inlet flange 107F, downwards till the area where the outer wall 133 merges with the inner wall 131 in the area adjacent the flow outlet 109.

The projections 143, 145 divide the outer cavity 141 in two flow passages 141A and 141B. The flow passages 141A and 141B are, in an embodiment, substantially symmetrical. The projections 143, 145 thus form a flow splitter: The flow entering the valve body 103 through the inlet flange 107F is split into two partial flows by the projection 143. The partial flows separately enter the flow passages 141A and 141B in which the flow splitter 143, 145 divides the outer cavity 141. The partial flows merge again before entering the throttling cage 111.

As can best be seen in FIGS. 3 and 5, the outer cavity 141 has a flattened cross-section, i.e. a cross-section with a larger dimension and a smaller dimension, the ratio between the smaller dimension and the larger dimension being less than 0.7, in an embodiment, less than 0.3, and, in an embodiment, equal to less than 0.2.

Figure 7:
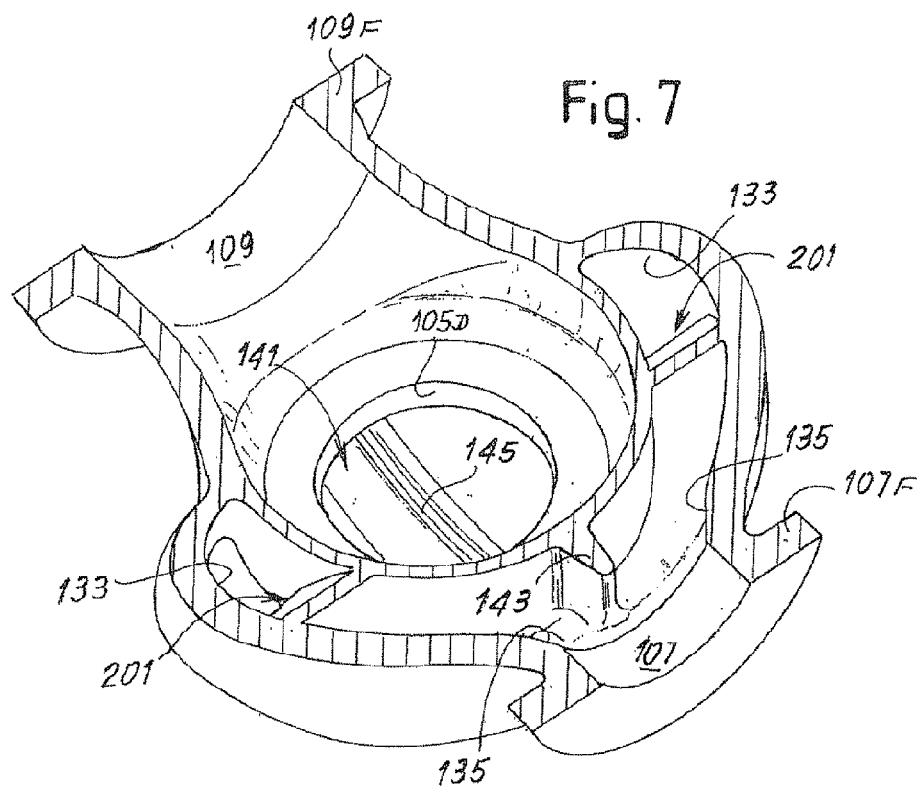
FIGS. 7 and 8 illustrate two cross sections according to lines VII-VII and VIII-VIII of FIG. 6, respectively.
Figure 8:
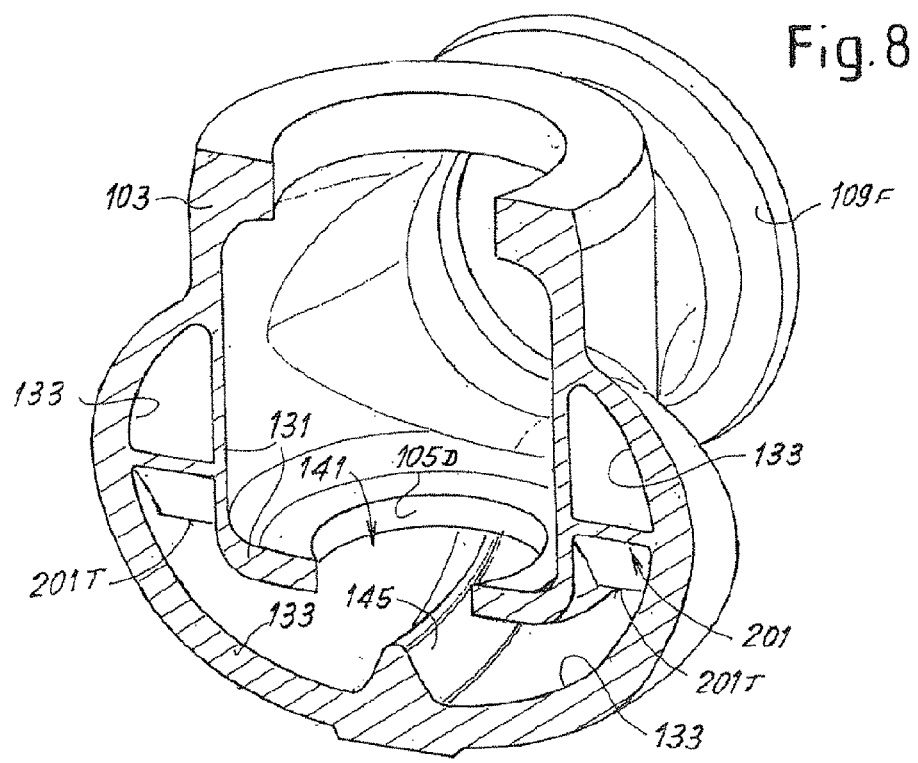

FIGS. 6 to 8 show a further embodiment of the subject matter disclosed herein. The same reference numbers are used to designate the same or equivalent portions or elements as in FIGS. 2 to 5. Only the body of the valve is illustrated in FIGS. 6 to 8 for the sake of clarity. It shall be understood that a plunger and optionally a throttling cage can be arranged in the valve body as illustrated in connection with the previously described embodiment of FIGS. 2 to 5.

According to FIGS. 6 to 8 the valve 101 comprises a valve body 103, forming an inner cavity 105 therein. The valve 101 further comprises a fluid inlet 107 surrounded by a inlet flange 107F, and a fluid outlet 109 surrounded by an outlet flange 109F. Also in this embodiment, the inlet flange 107F and the outlet flange 109F are, in an embodiment, co-axial and have a common center line or common axis A-A.

The inner cavity 105 has a first end 105A, an opposite, second end 105B and a side portion 105C extending between the first end 105A and second end 105B. The second end 105B is at least partly formed by a bonnet 123 screwed on the remaining part of the valve body, whilst the side portion 105C and the first end 105A are integrally formed e.g. by casting.

The first end 105A has a central aperture 105D in which one end of a throttling cage (not shown) is sealingly engaged.

The first end 105A and the side portion 105C of the inner cavity 105 are formed by an inner wall 131 of the valve body 103. The inner wall 131 is partly surrounded by an outer wall 133 extending around the part of the inner wall 131 opposite the bonnet (not shown) and there around. The outer wall 133 extends from the central part of the valve body 103 to form the inlet flange 107F and an inlet duct 135, which represents a first portion of the flow inlet 107.

On the side opposite the inlet flange 107F, the inner wall 131 extends outwardly forming the outlet flange 109F as well as the flow outlet 109 extending from the inner cavity 105 to the outlet flange 109F.

The outer wall 133 and the inner wall 131 define an outer cavity 141 there between. The outer cavity 141 partly surrounds the inner cavity 105 and is in fluid communication therewith through the aperture 105D provided in the inner wall 131. The outer cavity 141 forms a portion of the fluid inlet 107, being in fluid communication with the inlet port formed by the inlet flange 107F and the inlet duct 135.

On the outer surface of the inner wall 131 opposing the inlet flange 107F a projection 143 is provided. The projection 143 extends along the outer surface of the inner wall 131 and merges into a projection 145 extending towards the interior of the outer cavity 141 from the inner surface of the outer wall 133, facing the aperture 105D provided in the inner wall 131 delimiting the inner cavity 105. The two projections 143 and 145 develop as a single integral body which extends from the top of the flow inlet 107, in front of the inlet flange 107F, downwards till the area where the outer wall 133 merges with the inner wall 131 adjacent the flow outlet 109. The projections 143, 145 divide the outer cavity 141 in two flow passages 141A and 141B. The flow passages 141A and 141B are, in an embodiment, substantially symmetrical. The projections 143, 145 thus form a flow splitter: The flow entering the valve body through the inlet flange 107F is split into two partial flows by the projection 143. The partial flows separately enter the flow passages 141A and 141B in which the flow splitter 143, 145 divide the outer cavity 141. The partial flows merge again before entering the throttling cage (not shown).

In the embodiment illustrated in FIGS. 6 to 8, a respective secondary flow splitter 201 is arranged in each flow passage 141A, 141B of the outer cavity 141. In the embodiment shown, each secondary flow splitter 201 extends across the entire width of the outer cavity 141, i.e. from the outer surface of the inner wall 131 to the inner surface of the outer wall 133.

In some embodiments, each secondary flow splitter 201 extends from a leading edge 201L to a trailing edge 201T. The leading edge 201L faces the inlet flange 107F and the trailing edge 201T is oriented towards the bottom of the outer cavity 141, i.e. the area of the outer cavity 141, where the projection 145 is arranged. Each secondary flow splitter 201 is, in an embodiment, curved from the leading edge 201L to the trailing edge 201T, according to the direction of the fluid flowing from the inlet, across the outer cavity 141 and towards the inner cavity 105 of the valve body.

In this embodiment, therefore, the inlet flow is split in four sub-flows by the main flow splitter 143, 145 and the two secondary flow splitters 201.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

What is claimed is:

1. A valve comprising:
    a valve body comprising:
        an inner cavity;
        an outer cavity at least partly surrounding the inner cavity;
        a fluid inlet; and
        a fluid outlet,
        wherein the outer cavity is in fluid communication with the fluid inlet and with the inner cavity; and wherein the inner cavity is in fluid communication with the fluid outlet;
    a plug moveably arranged in the inner cavity;
    at least one flow splitter arranged in the outer cavity extending from the fluid inlet to the inner cavity and forming in the outer cavity at least two flow passages extending from the fluid inlet to the inner cavity; and
    an aperture placing the inner cavity in fluid communication with the outer cavity.

2. The valve according to claim 1, the aperture is configured to be selectively opened and closed by the plug.

3. The valve according to claim 1, wherein the flow splitter extends across the fluid inlet, dividing the fluid inlet in at least two ports in fluid communication with the outer cavity.

4. The valve according to claim 3, wherein the at least two ports are substantially symmetrical with respect to the flow splitter.

5. The valve according to claim 1, wherein the inner cavity is substantially symmetrical about a center line.

6. The valve according to claim 1, wherein the valve body comprises an inner wall surrounding the inner cavity and an outer wall at least partly surrounding the inner wall; the outer wall and the inner wall defining the outer cavity there between.

7. The valve according to claim 6, wherein the inner wall forms a flow outlet channel extending from the inner cavity to an outlet flange.

8. The valve according to claim 6, wherein the outer wall forms an inlet flange.

9. The valve according to claim 7, wherein the inlet flange and the outlet flange are substantially coaxial.

10. The valve according to claim 9, wherein the inner cavity has an axis substantially orthogonal to a common axis of the outlet flange and said the inlet flange.

11. The valve according to claim 6, wherein the flow splitter comprises
    a first projection extending from the inner wall and facing the fluid inlet; and
    a second projection extending from the outer wall and facing the fluid inner wall.

12. The valve according to claim 11, wherein the second projection is arranged opposite the aperture placing said the inner cavity in fluid communication with the outer cavity, the aperture being provided in the inner wall surrounding the inner cavity of the valve.

13. The valve according to claim 11, wherein the first projection merges in the second projection thus forming a continuous body.

14. The valve according to claim 1, wherein at least one secondary flow splitter is arranged in each flow passage in the outer cavity.

15. The valve according to claim 14, wherein each secondary flow splitter extends from the inner wall to the outer wall across a width of the respective flow passage in the outer cavity.

16. The valve according to claim 14, wherein each secondary flow splitter is curved and extends from a leading inlet edge, facing the fluid inlet, towards a trailing edge facing a bottom of the outer cavity.

17. The valve according to claim 1, wherein the inner cavity is defined by at least a first end, a second end opposing the first end, and a side portion extending between the first end and the second end, and
    one of the first end and the second end comprises the aperture in fluid communication with the outer cavity, and the other of the first end and the second end comprising a bonnet with a through passage for a plug stem passing there through.

18. The valve according to claim 17, wherein the side portion has a port fluidly connecting said the inner cavity to the fluid outlet.

19. The valve according to claim 1, further comprising a throttling cage at least partly arranged in the inner cavity, the plug being movably arranged in the throttling cage.

20. The valve according to claim 1, wherein the plug co-acts with a closure seat to selectively opening or closing the valve, and wherein the closure seat is arranged between the outer cavity and a center line of the fluid outlet.

21. The valve according to claim 20, wherein a distance between the closure seat and the outer cavity is smaller than a distance between the closure seat and the center line of the fluid outlet.

22. The valve according to claim 1, wherein each one of the two flow passages formed by the at least one flow-splitter in the outer cavity has an elongated cross section.

23. The valve according to claim 22, wherein the elongated cross section has a minimum dimension and a maximum dimension, the ratio between the minimum dimension and the maximum dimension being less than 0.7.

* * * * *